Feb. 20, 1940.  O. W. GITHENS ET AL  2,190,658
MOTION PICTURE PROJECTOR
Filed June 3, 1937      8 Sheets-Sheet 2

INVENTORS
OTTO W. GITHENS
GEORGE KENDE
BY EVERETT MELBOURN PORTER
ATTORNEY

Feb. 20, 1940.　　O. W. GITHENS ET AL　　2,190,658
MOTION PICTURE PROJECTOR
Filed June 3, 1937　　8 Sheets-Sheet 3

INVENTORS
OTTO W. GITHENS
GEORGE KENDE
BY EVERETT MELBOURN PORTER

ATTORNEY

Patented Feb. 20, 1940

2,190,658

UNITED STATES PATENT OFFICE 2,190,658

MOTION PICTURE PROJECTOR

Otto W. Githens and George Kende, New York, and Everett Melbourn Porter, Brooklyn, N. Y., assignors, by mesne assignments, to Universal Camera Corporation, New York, N. Y., a corporation of Delaware Application June 3, 1937, Serial No. 146,182

14 Claims. (Cl. 88—17)

This invention relates generally to improvements in motion picture projectors.

One of the objects of our invention is to provide an improved motion picture projector construction of the character described, in which a unitary and integrally cast frame is adapted to support all of the film moving mechanism.

Another object of our invention is to provide an improved motion picture projector construction of the character described whereby the optical system, including the lens, the film and light apertures and the light source are so designed as to be in constant proper alignment.

Another object of our invention is to provide an improved motion picture projector construction of the character described having highly improved intermittent film advancement mechanism operating in cooperation with highly improved film passageway construction and framing mechanism.

Still another object of our invention is to provide, in a motion picture projector construction of the character described, an improved fire shutter device, designed to prevent blistering or burning of the film.

A further object of our invention is to provide an improved motion picture projector construction of the character described having highly improved light source housing and mounting.

A still further object of our invention is to provide a generally improved motion picture projector construction of the character described, which shall comprise relatively few and simple parts, which shall be easy to assemble, which shall be relatively inexpensive to manufacture, which shall be rugged in construction yet pleasing in appearance, and which at the same time shall operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention.

Referring now in detail to the drawings, we have disclosed a motion picture projector construction of the character described and which embodies the novel features of our invention.

As shown in Figs. 1 to 7, the projector comprises a base 30 which is adapted to house an electric motor M of usual construction, the switches S and S', a ventilating fan 168, a transformer T, all of which will be described in greater detail hereinafter. Attached to the top wall 30a of the base 30 is a main supporting frame 31 substantially rectangular in shape and having integrally cast extensions or reel arms 32 and 33, as clearly shown in Figs. 1 and 3. The reel arms 32 and 33 are provided with integrally cast bearing brackets 34 and 35 (see Fig. 5), into which there is journalled the shafts 36 and 37, which are designed to receive thereon for rotation therewith suitable take-off and take-up reels 38 and 39. The reel arms 32 and 33 may be provided with reinforcing ribs 32a and 33a, if desired. The frame 31 is provided with an integrally cast portion 31a which extends from the bottom edge of the said frame 31 at right angles thereto and is adapted to overlie the top wall 30a of the base 30. Integral with the frame 31 and with the portion 31a is a vertical wall 31b disposed at right angles to the portion 31a and also to the body of the frame 31, as clearly shown in Figs. 1 and 3. The wall 31b is so constructed and arranged as to serve as one side wall of the lamp house 40, and which will be described in greater detail hereinafter. The portion 31a of the frame 31 may be fixed to the base 30 by any suitable attaching means, such as for example, a plurality of screws 41, passing through the frame portion 31a and received in the threaded holes 41a in the top wall 30a of the base (see Fig. 6), so that the frame 31 is held rigidly in upright position.

The frame 31 is so designed and constructed that in addition to supporting the reels 38 and 39, it is adapted to be used as a support for the intermittent film movement mechanism to be described hereinafter, and housed in a casing 42, the film sprocket wheels 43 and 44, the lens holder support 142, the film passageway 46, the shutter 100, and a chain of gearing for synchronously driving the film movement and the shutter together with the sprocket wheels, said chain of gearing being separately housed within a hollow casing 47 (see Figs. 5 and 8), to be more fully described hereinafter.

It is noted that the front wall B of the base 30 is of tapered contour, as shown, and is so designed to provide clearance for the free rotation of the reel 39. The base 30 may be provided with a pair of rearwardly disposed fixed legs 48 and a front leg 49 to prevent direct contact of the bottom of the base with the table support upon which the projector 41 is adapted to rest. The front leg 49 may be made adjustable, by providing a screw-threaded aperture 50 in the bottom wall of the base 30 through which there is adapted to pass a screw-threaded shank 51 attached to the leg 49 and provided at the upper end thereof with a knurled knob 52 to facilitate the turning of the said screw 51. When it is desired to elevate the front end of the projector mechanism, the knurled knob may be turned in one direction, and for lowering the front end of said projector, the knurled knob is turned in the opposite direction.

Figure 1:
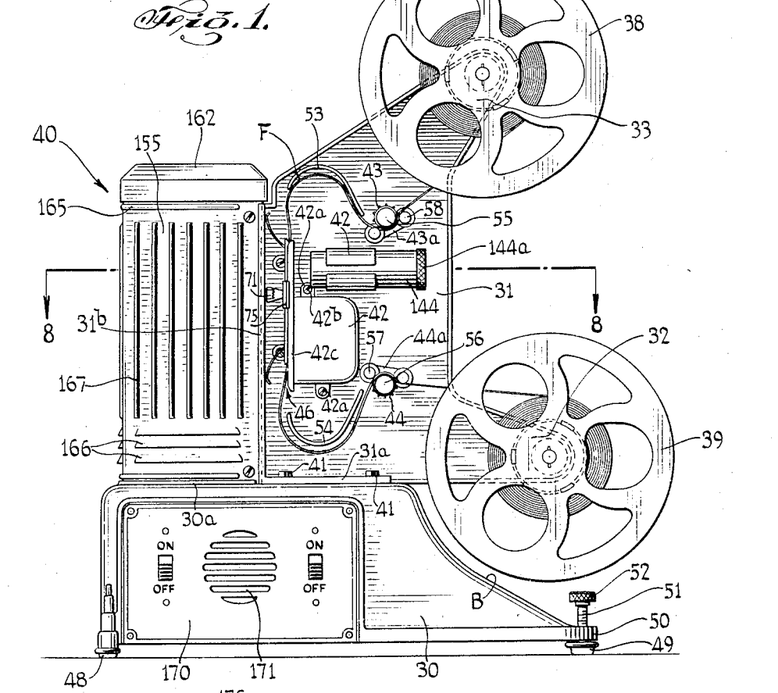
Fig. 1 is a side elevational view of a motion picture projector embodying our invention.
Figure 2:
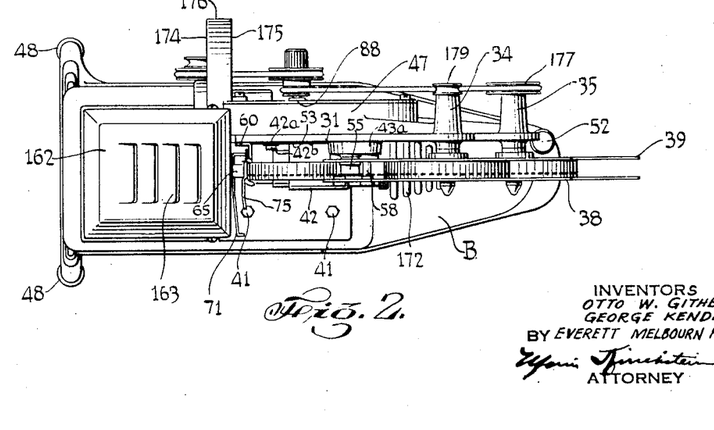
Fig. 2 is a top plan view of the projector illustrated in Fig. 1.

The roll of film F to be projected is contained on the take-off reel 38 and is threaded over the sprocket wheel 43 and formed into a loop, as shown in Fig. 1 of the drawings, after which it is passed through the film passageway 46 soon to be described, and then formed into a second loop after which it is passed over the sprocket wheel 44 and on to the wind-up reel 39. The surface of the frame 31 may be provided with curved ridges 53 and 54 which are adapted to serve as guides for forming the above-mentioned loops in the film F before and after passing through the film passageway 46.

The sprocket wheels 43 and 44 are of customary construction and fixed to the shafts 55 and 56 which in turn are journaled in the brackets 43a and 44a integral with the frame 31. Suitable pairs of guide rods 57 and 58 for guiding the film on to the sprockets 43 and 44 are provided, as shown in Figs. 1 and 14.

In Figs. 15 to 18, we have disclosed the construction of our film passageway 46 which comprises a longitudinal member 59 disposed parallel to the wall 31b and spaced therefrom and which is provided with a pair of apertured ears 60 at right angles thereto, said ears 60 being adapted to overlie the frame 31. The member 59 is rigidly attached to the frame 31 by a pair of rivets 61 received in the apertured ears 60 and passing through the frame 31 (see Fig. 16), or any other suitable attaching means may be employed. The member 59 comprises a relatively flat portion 59a defining a longitudinal pathway for the film F and provided with integral guide portions 59b and 59c at one side thereof and a rounded portion 59d extending beyond said flat portion 59a on the opposite side thereof. The rounded portion 59a is also adapted to serve as a means to facilitate the insertion of the film in the passageway 46. The member 59 is provided with a film aperture 62, adapted to register with the photographic images on the film F. A film gate 64, cooperating with the member 59, is provided in predetermined adjacent relationship to the flat surface 59a of the member 59 to define a passageway 46 for the film F. The gate 64 is resiliently urged into contact with a portion of the member 59 by means of a pair of leaf springs 65 having one end thereof rigidly attached to the gate 64, by any suitable attaching means, such as for example, the rivets 66, and having the other free end thereof rounded off and contactively engaging the surface of the wall 31b, as clearly shown in Fig. 15. The film gate 64 is also provided with a film aperture 68 which is adapted to be in alignment with the aperture 62 of the member 59.

For properly framing the photographic image with respect to the aperture 62, there will now be described the novel means provided for adjustably registering the apertures 68 and 62. Integral with the gate 64 and projecting from the side thereof is a portion 64a which is provided with a centrally disposed notch 69 extending inwardly from the outer edge of said portion 64a. Pivotally mounted on the wall 31b by means of a fixed pivot 70 is a lever 71 provided at one end thereof with an integral portion 72 bent substantially at right angles thereto and tapering to a point 73, as clearly shown in Fig. 15. The said point 73 is designed to be received in the notch 69, so that when the lever 71 is pivotally moved, the point 73 will slidably move the gate in a vertical direction so that the aperture 68 in the film gate 64 may be properly positioned with respect to the aperture 62 in the fixed member 59. If desired, the lever 71 may be provided at the outer free end thereof with an angularly bent portion 74 (see Fig. 8) to facilitate the handling thereof. There may also be provided, integral with the gate 64, an extending portion 75 projecting from the said gate 64 in a direction opposite to that of the portion 64a and designed to facilitate the movement of the gate 64 away from the fixed member 59 in order to permit the insertion of the film F in the passageway 46. To separate the gate 64 from the member 59, it is merely necessary to press the portion 75 with a finger against the action of the springs 65 to provide sufficient space to insert a film or to completely remove the gate 64 for any desired reason, such as cleaning or adjustment.

Figure 13:
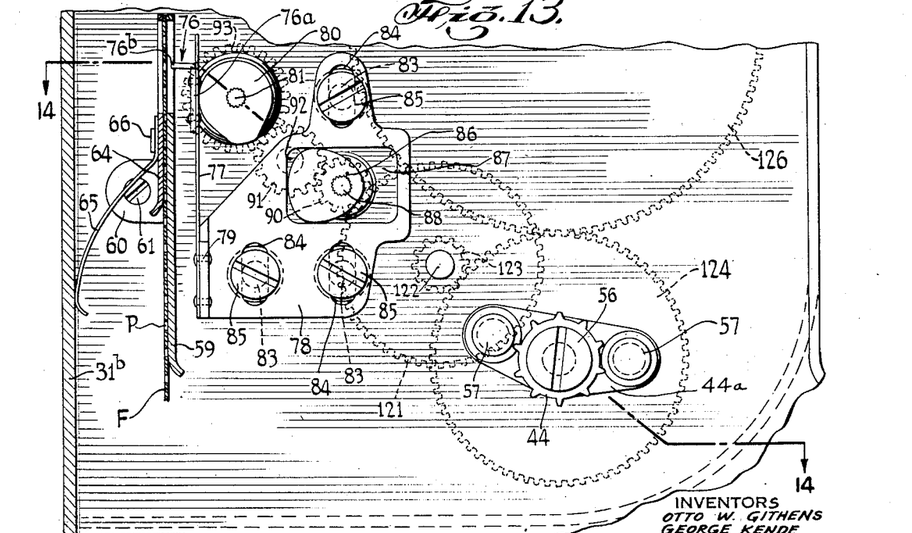
Fig. 13 is an enlarged detail, partly sectional, of a portion of the mechanism of the projector shown in Fig. 1.
Figure 14:
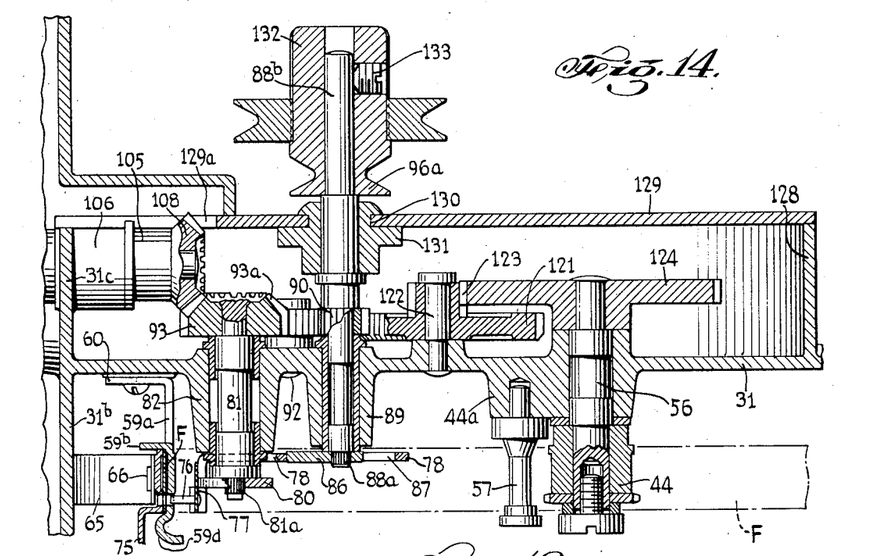
Fig. 14 is a cross-sectional view taken substantially on the line 14—14 of Fig. 13.
Figure 15:
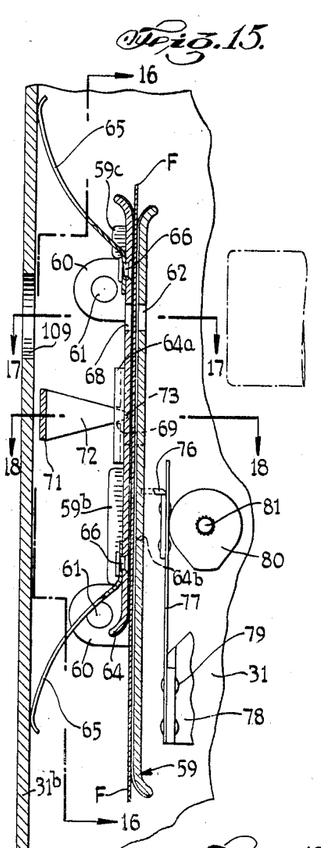
Fig. 15 is an enlarged sectional view illustrating a portion of the construction of the film passageway of the projector shown in Fig. 1.
Figure 16:
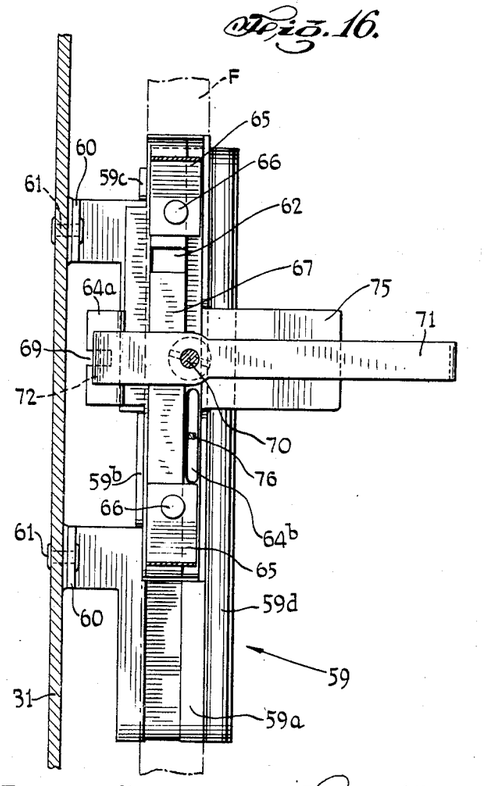
Fig. 16 is a cross-sectional view taken substantially on the line 16—16 of Fig. 15.
Figure 17:
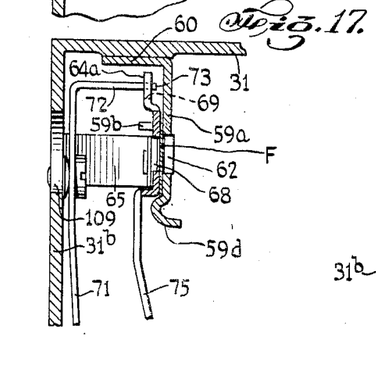
Fig. 17 is a cross-sectional view taken substantially on the line 17—17 of Fig. 15.
Figure 18:
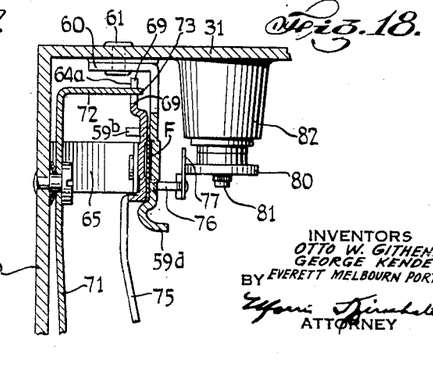
Fig. 18 is a cross-sectional view taken substantially on the line 18—18 of Fig. 15.
Figure 19:
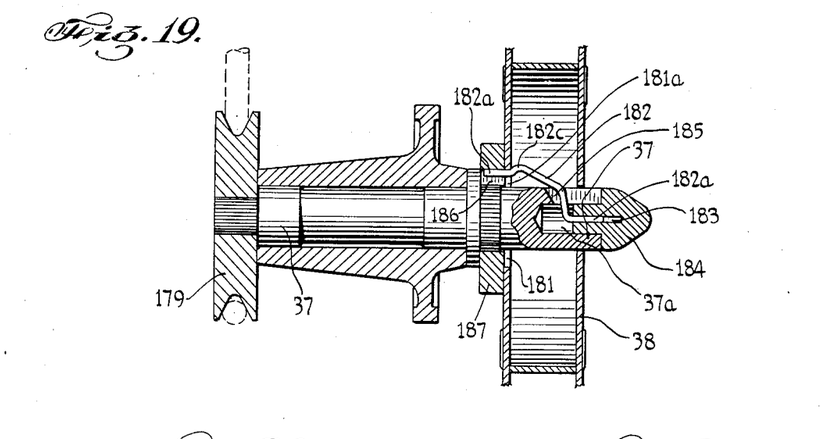
Fig. 19 is an enlarged cross-sectional view taken substantially on the line 19—19 of Fig. 7.
Figure 20:
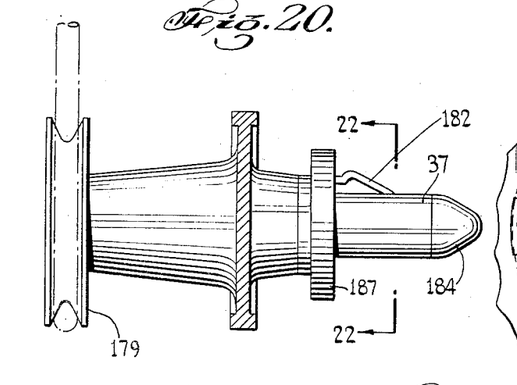
Fig. 20 is a view similar to Fig. 19 but in elevation and with the reel removed.
Figure 21:
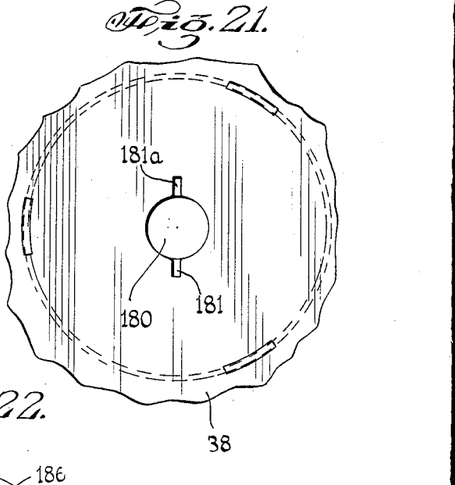
Fig. 21 is a fragmentary view of the hub portion of the reel.
Figure 22:
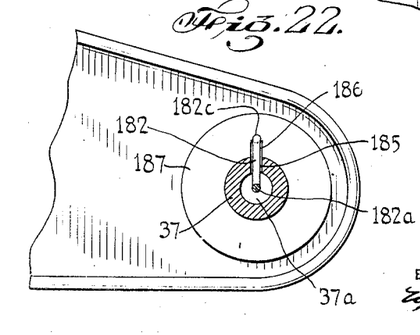
Fig. 22 is a cross-sectional view taken substantially on the line 22—22 of Fig. 20.

For intermittently advancing the film through the film passageway 46 above described, we have provided the following novel mechanism which is clearly illustrated in Figs. 13 and 14:

It is noted that the film illustrated in the drawings is of the type known as 8 mm. with a single row of perforations P adjacent one edge thereof, but it is understood that a motion picture projector may be constructed in accordance with our invention in which any other type or size of film may be satisfactorily employed. Our improved film movement comprises a film claw 76 which may be an angle shaped member, as shown, having one leg 76a thereof rigidly attached to a vertically disposed leaf spring 77, normally parallel to the film passageway 46, and the other leg 76b extending outwardly from said spring 77 at an angle thereto. The spring 77 is rigidly attached at the lower end thereof, to a shuttle 78, by any suitable attaching means, such as rivets 79. The claw 76 is adapted to be moved toward and away from the film at a predetermined rate so that the portion 76b thereof will regularly pierce the perforations P in the film and be withdrawn therefrom. It is understood, of course, that the film F must be intermittently advanced in synchronism with the positioning of each image, and be at rest for a predetermined interval of time while in registered relationship with the film apertures 62 and 68. To provide this proper synchronism, we employ a cam 80 fixed to a shaft 81 for rotation therewith, said shaft 81 being journaled in a bracket 82 which is integral with the frame 31. The cam 80 may be fixed to the shaft 81 by having a portion 81a of said shaft adjacent the end thereof knurled, and the aperture in the cam 80 correspondingly knurled so that upon assembly of the cam 80 on the shaft portion 81a relative rotation between said shaft and cam will be prevented. When the claw portion 76b is in proper alignment with a perforation, the rotation of the cam 80 will cause the said claw portion 76b to be moved toward the film F to pierce the perforation P against the action of the spring 77. The mechanism is so designed that after the claw 76 has pierced the perforation P, it is then pulled or moved in a downward direction to advance the film a predetermined amount. When the lowermost position of the claw has been reached, the cam 80 is so designed that it will by that time have released the pressure on the spring 77 to permit the withdrawal of the claw 76 from the perforation P in the film and the claw will then be free to move upwardly in readiness to again pierce another perforation P for a second advancing movement of the film, and so on. To permit the insertion of the point of the claw 76 a sufficient distance in the perforation P, the film gate 64 is provided with a slotted aperture 64b (see Fig. 16) of sufficient size to accommodate the full stroke of the film claw 76.

The vertical reciprocating movement of the claw 76 is produced by means of the shuttle 78 which is slidably mounted for straight-line reciprocation by means of the projecting pins 83 integral with the frame 31 which receive therein the enlarged head screws 85, said screws 85 being adapted to pass through the elongated slots 84. The heads of the screws 85 serve to prevent lateral displacement of the shuttle 78. For causing synchronous uniform reciprocation of the shuttle 78, there is provided a cam 86 adapted to operate in an aperture 87 in the shuttle 78. The cam is fixed to a main shaft 88 which is journalled in a bracket 89 integral with the frame 31. The cam 86 may be frictionally fixed to the shaft 88 by knurling a portion 88a of the shaft 88 and correspondingly knurling the aperture in the cam 86. Mounted on the main shaft 88 and disposed on the opposite side of the frame 31 from that of the bracket 89, is a pinion 90 which is adapted to mesh with an idler pinion 91 freely rotatably mounted on the shaft 92 which is fixed to the frame 31. The pinion 91 is in turn adapted to mesh with a gear 93 fixed to the shaft 81 which carries the cam 80.

It is thus apparent from the above description that when the main shaft 88 is rotated, the cam 86 will cause straight line vertical reciprocation of the shuttle 78, and at the same time, the pinion 90 will cause rotation of the gear 93 through the idler pinion 91 so that the cam 81 will be caused to rotate which will intermittently urge the claw 76 into engagement with the perforations P against the action of the spring 77, and then upon continued rotation of the cam 81 the claw 76 will be withdrawn from the perforation P due to the action of the spring 77.

The above-described intermittent film movement mechanism is so designed that the shuttle cam 86 will rotate at twice the speed of the claw feed cam 80, in order that the pull-down period of the claw 76 will be relatively small as compared with its period of rest. In other words, for every two reciprocating cycles of the shuttle 78 there will be one feed cycle of the claw 76. It is noted in the above-described construction that the claw 76 is caused to move toward and away from the film at substantially right angles to the direction of reciprocation of the shuttle 78.

The main shaft 88 is adapted to be driven from the motor M (see Figs. 3, 4 and 5) by means of the pulley 94 fixed to the motor shaft 95 for rotation therewith, and the pulley 96 fixed to the main driving shaft 88 for rotation therewith, through an interconnecting belt 97. The pulley 94 may be provided with a smaller pulley portion 92a in order to furnish a change of speed for driving the main shaft 88. The belt 97 may be constructed of any suitable material, such as for example, of coiled spring wire of predetermined tension.

Designed to operate in synchronism with the above-described intermittent film advancing apparatus, we have provided in accordance with our invention, a shutter device which is clearly illustrated in Figs. 8 and 9 and which will now be described.

The shutter 100 is of the annular three blade type having the symmetrically arranged blades 101, 102 and 103, and is fixed to a collar 104 by the rivets 104a, said collar 104 being mounted on a shaft 105 for rotation therewith. The shaft 105 is journalled in a bracket 106 which is attached to a portion 31c of the wall 31b extending beyond the frame 31 or which may be integral therewith, as shown. At one end of the shaft 105 there is fixed, by means of a set screw 107, a bevel gear 108 adapted to mesh with the beveled portion 93a of the combination gear 93, mounted on the shaft 81. It is thus seen that when the main shaft 88 is driven from the motor M in the manner above described, the shaft 105 will be caused to rotate in synchronism with the operation of the film advancing mechanism. The shutter 100 is designed to synchronously cover and uncover a light aperture 109 in the wall 31b, said aperture being in alignment with the apertures 62 and 68 and in optical alignment with the light source to be described hereinafter. Our three blade shutter 100 operating in synchronism with the film movement mechanism previously described, is so designed that the film is caused to be pulled down in less time than it takes for one-sixth of a revolution of the shutter, thereby giving complete coverage of the aperture 109 by the shutter during the period that the film is being pulled down. Our three blade shutter 100 is designed to provide approximately 48 alterations or complete cycles from dark to light per second, which will give pleasing results to the eye for the projector built in accordance with our invention, and designed to operate at a film speed of 16 frames per second. Each of the blades 101, 102 and 103 of the shutter 100 is provided with bent-up ears 101a, 102a and 103a which are disposed at an angle to the flat surface of the shutter so as to set up convection currents of air in the lamp house (soon to be described) to thereby aid in the cooling of the same.

To enable the projector designed in accordance with our invention to be used for the showing of still pictures as well as motion pictures, there is provided an automatically operated fire shutter 110 interposed between the source of light and the aperture 109 and designed to be effectively positioned whenever the said aperture is in open communication with said light source through the spaces between the shutter blades 101, 102 and 103. The fire shutter 110 is freely rotatably mounted on the shutter shaft 105, and comprises a radially extending portion 110a adapted to normally rest in such position as to cover the aperture 109. The portion 110a is provided with a plurality of closely spaced perforations 111, through which sufficient light is adapted to pass in order to clearly project the picture from the film. By this construction the film is normally shielded from the full force of the light and heat from the light source and may be kept standing in such position for about 30 to 40 seconds while each picture is shown, without burning, blistering, or in any other way, damaging the film.

Figures 9, 10, 12:
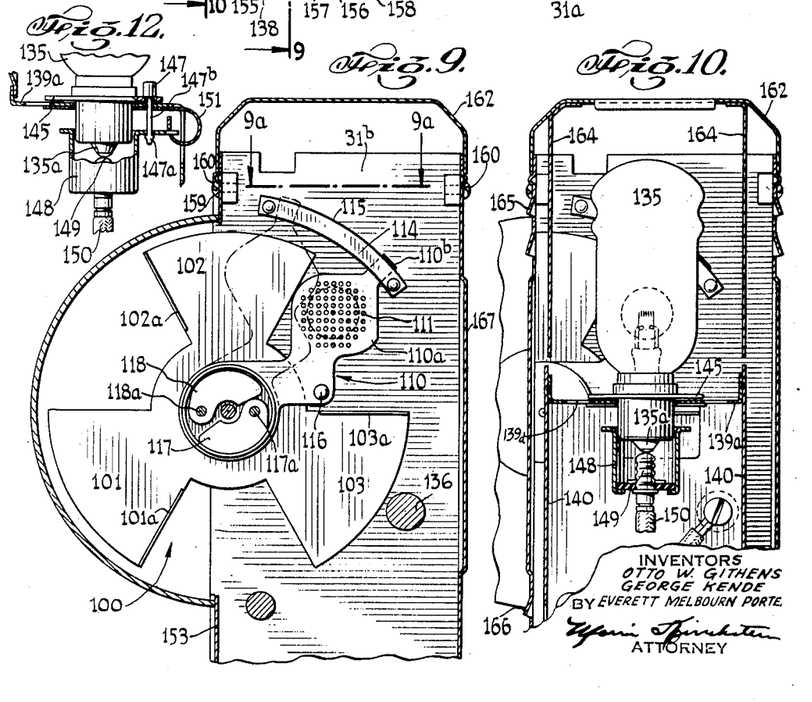
Fig. 9 is a cross-sectional view taken substantially on the line 9—9 of Fig. 8.
Fig. 10 is a cross-sectional view taken substantially on the line 10—10 of Fig. 9.
Fig. 12 is a cross-sectional view taken substantially on the line 12—12 of Fig. 8.

The fire shutter 110 is adapted to assume the effective position described, with the portion 110a covering the aperture 109, by reason of its own weight, or if desired, a counterweight 116 may be fixed to the fire shutter, as shown, to normally maintain the same in the position as shown in Fig. 9. Means are provided whereby upon rotation of the shaft 105 to operate the shutter 100 for the purpose of projecting motion pictures, the fire shutter will be automatically moved out of its full-line position, as shown in Fig. 9, to the dotted-line position to uncover the aperture 109. This is accomplished by means of a pair of symmetrically disposed and pivotally mounted members 117 and 118 freely rotatably mounted on the pivots 117a and 118a, respectively, said pivots being in turn fixed to a disk member 119 fixed to the end of the shaft 105 for rotation therewith. The members 117 and 118 are designed to be received in a drum 120 fixed to the fire shutter 110 for integral movement therewith. It is thus seen that when the shaft 105 is rotated at a predetermined speed, the members or weights 117 and 118, due to the action of the centrifugal force generated, will swing outwardly to frictionally engage the inner wall of the drum 120 and thus cause rotation of said drum with the shaft 105, said drum in turn, carrying the fire shutter from the full-line position to the dotted-line position, shown in Fig. 9. When the speed of rotation of the shaft 105 is diminished or entirely finally stopped, the weights 117 and 118 will assume their normal position, out of contact with the inner wall of the drum 120 to thereby permit the fire shutter 110 to swing back to its original position covering the aperture 109 by the action of gravity due to its own weight or under the influence of the additional weight 116.

Figures 4, 9A:
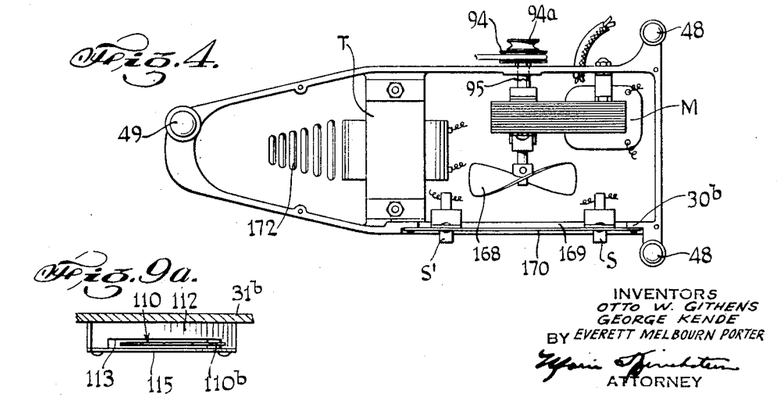
Fig. 4 is a bottom plan view of the projector shown in Figs. 1 to 3, but having the bottom wall thereof removed.
Fig. 9a is a cross-sectional view taken substantially on the line 9a—9a of Fig. 9.
Figure 5:
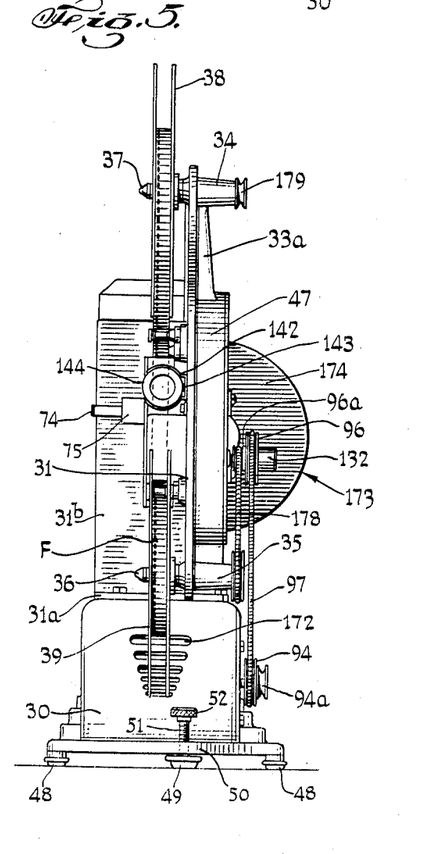
Fig. 5 is a front elevational view of the projector illustrated in Fig. 1.
Figure 6:
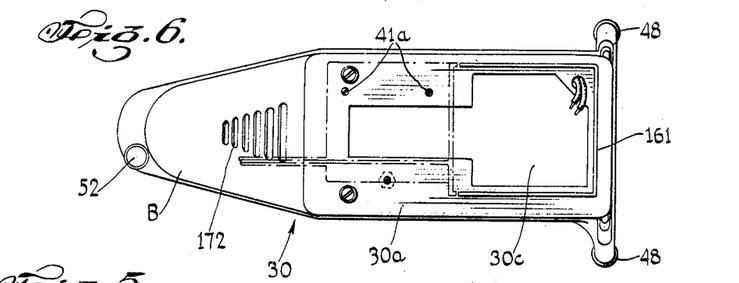
Fig. 6 is a cross-sectional view taken substantially on the line 6—6 of Fig. 3.
Figure 7:
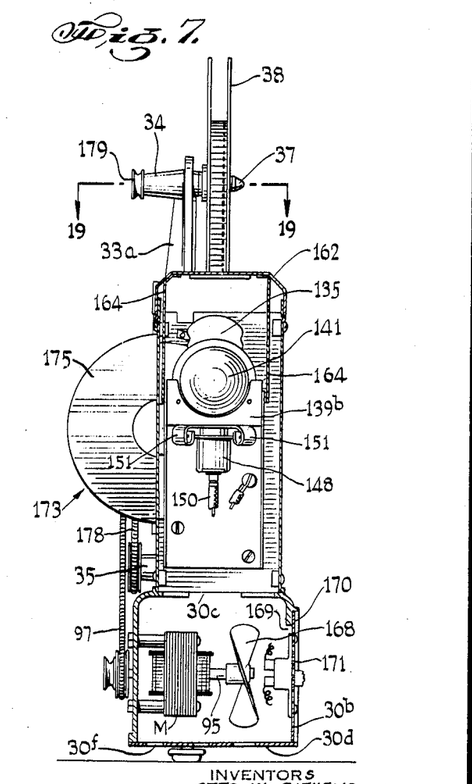
Fig. 7 is a cross-sectional view taken substantially on the line 7—7 of Fig. 3.

As shown in Figs. 9 and 9a, the fire shutter 110 is designed to travel in a guided path by means of an arcuate-shaped lug 112 fixed to the wall 31b, and provided with a notched portion 113, said notch 113 being covered with a plate 114 to define a slotted pathway 115 in which an extension 110b of the fire shutter portion 110a is adapted to travel. The pathway 115 is of predetermined size to limit the amount of rotational movement of the fire shutter 110. One end of the pathway is so disposed that the shutter 110 will be positioned, as shown in Fig. 9, so that the perforations 111 will cover the aperture 109, while the opposite end of the pathway 115 serves to limit the amount of rotational movement of the fire shutter 110.

Figure 3:
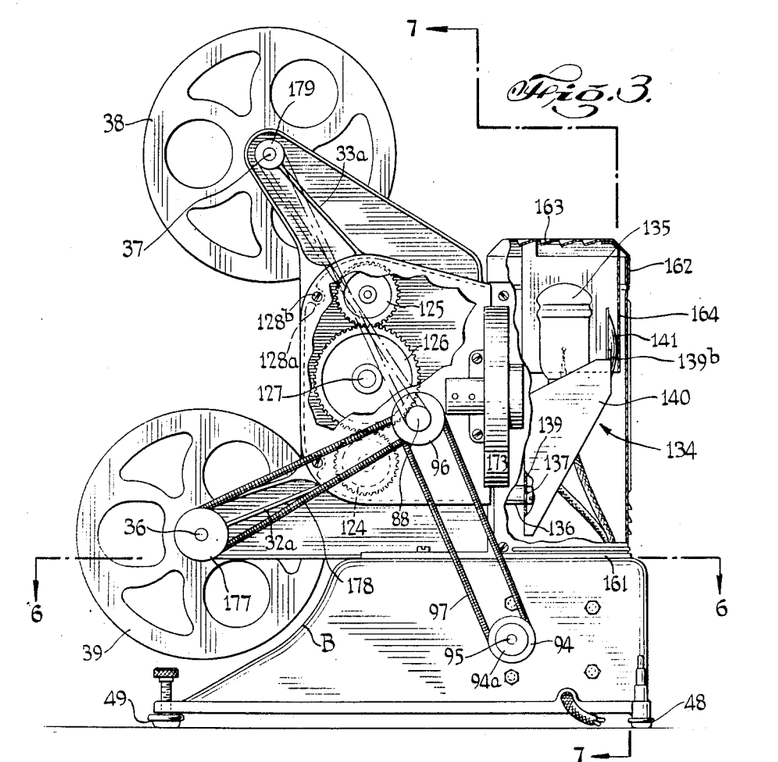
Fig. 3 is a view similar to Fig. 1 but showing the opposite side thereof, and having portions broken away to disclose the construction thereof.

Means are provided, as shown in Figs. 3, 13 and 14, for simultaneously driving the film sprockets 43 and 44 from the main driving shaft 88 in synchronous operation with the film claw and shutter mechanism above described. For this purpose we have provided a gear 121 in mesh with the gear 90 on the main shaft 88, said gear 121 being freely rotatably mounted on a shaft 122 fixed to the frame 31. Freely rotatably mounted on the same shaft 122 is a pinion 123 integral with the gear 121 and which is adapted to mesh with a gear 124 fixedly mounted on the shaft 56 for rotation therewith, upon which is also mounted the lower sprocket wheel 44, to cause rotation of said sprocket wheel 44. On the upper sprocket shaft 55 there is fixed, for rotation therewith, a gear 125 which is adapted to be driven from the gear 124 by means of an intermediate idler gear 126 freely rotatably mounted on the shaft 127 fixed to the frame 31.

By our invention we have also provided a construction whereby the chain of gearing for driving the mechanism to operate the projector, which in turn is driven from the main shaft 88, is all encased in dust-proof as well as relatively sound-proof housings, which are adapted to be readily accessible for repairs and other necessary adjustments. All of the gearing mechanism hereinbefore described for driving the intermittent film movement and the shutter, as well as the sprockets, from a main shaft interconnected with the motor, is enclosed in a dust-proof housing comprising a surrounding wall 128 integral with the frame 31 and extending at right angles therefrom a predetermined distance sufficient to cover all the above-described gearing. It is noted that the portion 31c of the wall 31b forms an integral part of the wall 128. The hollow casing area formed by the surrounding wall 128 is adapted to house the chain of gearing hereinbefore described and to be closed off by a removable cover 129. The said cover 129 is provided with an aperture 130 in which is fixedly mounted a bearing member 131 through which the main shaft 88 is adapted to pass, said main shaft being provided with an extended portion 88b projecting beyond the cover 129. The cover 129 may be provided with a notch 129a adjacent the periphery thereof to provide clearance for the slightly projecting bevel gear 108, as shown in Fig. 14. The inner wall 128 is provided with integral lugs 128a having screw-threaded openings therein, designed to register with corresponding openings in the cover 129. The said cover 129 is adapted to be removably attached to the housing by screws 128b.

On the projecting shaft portion 88b there are fixed the pulleys 96 and 96a for rotation therewith. The function of the pulley 96a will be more fully described hereinafter. Integral with the pulley 96a is an extension 132 passing through the pulley 96 and projecting a sufficient distance to enable the portion 132 to be used as a hand knob for turning the main shaft 88 for the purpose of starting or turning over the motor in order to drive the hereinbefore described chain of gearing. The portion 132 may have the surface thereof knurled to facilitate the gripping thereof, and may be fixedly attached to the shaft portion 88b by means of a set screw 133 to permit the ready removal of the pulleys 96 and 96a from the shaft portion 88b in order to remove the cover 129.

A casing cover 42 is also provided which is designed to enclose the intermittent film movement mechanism as described hereinbefore. The casing 42 comprises a hollow substantially rectangular casing member open at the back and at one side 42c to permit free operation of the film claw 76 and provided with a pair of apertured ears 42a adapted to be adjacent the frame 31. The frame 31 is provided with threaded apertures in registered relationship with the apertures in said ears 42a and adapted to be fixed to the frame 31 by means of screws 42b.

Our improved lamp house construction and mounting for the light source therein will now be described.

Referring particularly to Figs. 3 and 8 to 12, there is disclosed a light source mounting comprising a bracket 134 adapted to have mounted thereon a light source which is preferably a lamp 135 of the prefocus type. To insure the proper positioning and alignment of the light source 135 with respect to the reflector and the optical system to be hereinafter more fully described, the lamp bracket 134 is rigidly fixed to a plurality of lugs 136 which may be cast integrally with the wall 31b. The lamp bracket 134 is provided with holes 137 (see Fig. 3) designed to be in registered relationship with the lugs 136. The said lugs 136 may be provided with threaded openings into which there is received the screws 138 to solidly and accurately hold the lamp bracket in aligned relationship with the aperture 109 in the wall 31b. The bracket 134 comprises a wall 139 substantially parallel to the wall 31b and a pair of parallel walls 140 extending outwardly from the wall 139, the said parallel walls 140 being of substantially triangular shape, as shown in Fig. 3. A portion 139a of the wall 139 is bent over at right angles thereto to form a flat table support for the mounting of the prefocus lamp 135. Integral with the portion 139a is a portion 139b extending upwardly at right angles thereto, and parallel to the wall 139, which portion is adapted to serve as a mounting or holder for the reflector 141. The side walls 140 of the lamp bracket 134 may be weldedly fixed to an inturned flange of the portion 139b and the reflector 141 may in turn be rivetedly attached to the inner surface of the portion 139b.

It is noted from the above-described construction that the reflector 141 and the lamp bracket 134 for holding the light source 135, are of rigid construction so that when assembled, they will always be in constant alignment with respect to the aperture 109 in the wall 31b, which in turn, is designed to be in proper optical alignment with the film apertures 62 and 68. To insure constant and proper alignment of the lens with the reflector 141 and film apertures above mentioned, there is provided a lens holder support 142 which is permanently attached to the frame 31 by means of rivets 143. Into this lens holder support 142 there is slidably mounted a lens holder 144 which carries a lens of usual construction. The longitudinal axis of the lens holder 142 is designed to be in axial alignment with the film apertures 62 and 68 and the light aperture 109. The end portion 144a of the lens holder may be provided with a knurled shoulder to facilitate the sliding axial adjustment of the lens holder 144 in order to properly focus the projected image.

It is thus seen that the entire optical system beginning with filament of the light source 135 and including the reflector and the light aperture 109, as well as the film apertures 62 and 68, are always in proper alignment, so that once the projector is assembled, there is no further need for adjustments in alignment and the optical system will be prevented from becoming disaligned through vibration or jarring or for any other reason.

The light source 135 is removably mounted on the lamp bracket 134 in the following manner: The lamp 135 is provided with a prefocus sleeve 145 (see Figs. 10 and 12) which is permanently attached to the base of the lamp 135 after it has been properly focused so that the distance from the prefocus sleeve 145 to the filament center of the lamp will be identical with the distance from the horizontal shelf 139a to the center of the reflector 141 when the lamp 135 is properly mounted. To mount the lamp 135 on the wall 139a there is provided a plurality of notches 146 in the prefocus sleeve 145, said notches 146 having enlarged end portions 146a and 146b, and are adapted to have received therein the pin projections 147 (see Fig. 12) mounted in the wall 139a. The pins 147 are provided with reduced diameter shanks 147b projecting downwardly below the wall 139a a predetermined distance and are adapted to support a lamp socket 148 carrying an electrical contact member 149 leading to a source of electrical supply (not shown) by means of the lead line 150. The socket 148 is held in spaced relationship with respect to the wall 139a by means of resilient members 151. The socket 148 is limited in its downward movement with respect to the wall 139a and held in such position by means of the enlarged end portions 147a of the projections 147. When it is desired to mount the lamp 135 in position on the bracket 134, the enlarged notch ends 146b are aligned with respect to the projecting pins 147, after which the lamp is pressed downwardly so that the contact portion 135a thereof presses against the contact member 149 to force the socket 148 downwardly against the action of the springs 151. The lamp 135 is then turned slightly so that the shanks 147b of the projections 147 are received in the ends 146a of the notches 146 and thus held firmly in position. At the same time, electrical contact is made between the member 149 and the contact portion 135a of the lamp 135.

To facilitate the registration of the notches 146 with the pins 147, there is provided a notch 152 (see Fig. 11) in the periphery of the prefocus flange 145, said notch being adapted to be initially positioned substantially in alignment with the axis of the optical system and then turned in a clockwise direction to fix the lamp in position in the manner hereinbefore described.

A housing of substantially rectangular cross section is provided for completely enclosing the lamp 135 together with the lamp bracket 134. Said housing comprises the sides 153, 154, and 155 of a three-sided integral metal casing, removable as a unit, the fixed wall 31b which serves as the fourth side, and a removable cover 162. The wall 31b is provided with lugs 156 projecting inwardly of the housing and having screw-threaded holes 157 therein. The wall 31b is also provided with a pair of longitudinal ridges 158. The parallel sides 153 and 155 are provided with apertures 159, which are adapted to register with the apertures 157, so that the three-sided metal casing may be fixed to the wall 31b by means of screws 160. The ridges 158 serve as an aid in positioning the three-sided casing and at the same time form a light seal to prevent loss of light at the junction of the sides 153 and 155 with the wall 31b. The lower edge of the three-sided casing is adapted to rest on the top wall 30a of the base 30 and is positioned by means of a ridge 161 corresponding to the bottom edges of the sides 153, 154 and 155. Said ridge 161 also serves to prevent loss of light from within the housing at the junction of the top wall 30a and the three-sided casing. An opening 30c is provided in the top wall 30a of the base 30, communicating with the interior of the lamp housing.

The removable cover 162 is designed to completely enclose the top of the lamp housing and comprises a top wall and a continuous side wall thereof adapted to telescopically fit over the sides 153, 154, 155 and the wall 31b. The top wall of the cover 162 is provided with louvres 163, said louvres 163 being so designed as to provide ventilation for the lamp housing with a minimum loss of light. The cover is also provided with a three-sided downwardly extending jacket 164 which may be weldedly attached to the under surface of the top wall of the cover 162 and having portions adjacent the top edges thereof spaced from the top wall of said cover 162. The jacket 164 is designed to fit inside of and to be spaced from the sides 153, 154 and 155 of the three-sided casing. By the above described construction, it is seen that the jacket 164 completely surrounds the lamp 135 and reflector 141 on three sides, thereby creating a double wall with an air space between said walls of the jacket 164 and of the sides 153, 154 and 155. This construction tends to keep excessive heat away from the sides of the lamp house and also provides a more efficient updraft passage to the louvres 163 because of the difference in the temperatures of the said double walls. The sides 153, 154 and 155 are also provided with louvres 165 adjacent the top and louvres 166 adjacent the bottom thereof. The sides 153, 154 and 155 may also be provided with reinforcing longitudinal ridges 167, as shown in Fig. 1 of the drawings.

Figures 8, 11:
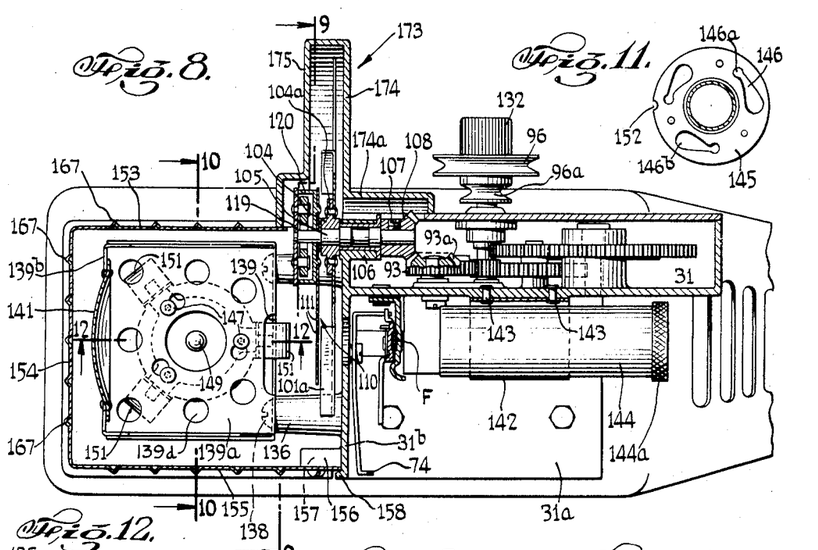
Fig. 8 is an enlarged cross-sectional view taken substantially on the line 8—8 of Fig. 1.
Fig. 11 is a detail of the prefocus flange of the lamp.

A portion of the free longitudinal edge of the casing side 153 may be notched as shown in Figs. 8 and 9, to provide clearance for the operation of the rotating shutter 100.

It is noted that the construction, as above described, is so designed that the top of the lamp 135 is approximately flush with the top of the three sides 153, 154 and 155 of the lamp housing so that when the cover 162 is removed, easy access may therefore be had for the removal of the lamp 135 for any desired purpose, such as replacement or adjustment.

The interior of the lamp housing is cooled by means of a fan 168 attached to the motor shaft 95 and disposed entirely within the base 30. A portion of the side wall 30b of the base 30 is provided with an aperture 169 which is covered over by a switch plate 170, (see Figs. 1, 4 and 7) said switch plate being provided with a plurality of ventilating apertures 171 communicating directly with the outside atmosphere. When the motor M is set in operation, the fan 168 will draw air from the surrounding atmosphere outside of the base through the ventilating apertures 171, said air being then forced upwardly through the lamp housing and out through the louvres 163 to ventilate said lamp house. The front portion B of the base may also be provided with a plurality of ventilating apertures 172 (see Figs. 4, 5 and 6).

Apertures 139d may be provided in the wall 139a adapted to furnish an unobstructed upward draft through the housing and on the lamp 135. (See Figs. 8 and 10.) The bottom wall 30d of the base 30 (see Fig. 7) may be provided with a plurality of perforations 30f.

To hide from view the rotating shutter 100, which partially extends beyond the lamp housing and at the same time to prevent said rotating shutter from drawing dust particles into the lamp house, there is provided a shutter housing 173 (see Figs. 3, 5, 7 and 8) which is designed to completely enclose the projecting portion of the shutter 100 and which comprises a pair of substantially semi-circular walls parallel to each other, such walls 174 and 175 being interconnected by an arcuate wall 176 adapted to permit the shutter 100 to freely rotate therein. A portion of the wall 175 is adapted to abut the side 153 of the lamp house while a flange portion 174a of the wall 174 is adapted to be attached to the cover 129 of the gear housing, said last named portion being designed to cover the slightly projecting bevel gear 108 (see Fig. 14).

We have provided means for driving the wind-up reel 39 to wind the film F thereon as it travels from the take-off reel 38 through the film passageway 46 above described. The reel 39 is driven from the main shaft 88 whenever the motor M is operated to drive the projector mechanism, by means of a pulley 177 which is mounted on the shaft 36 for rotation therewith and disposed at the opposite side of the reel arm 32 from that of the reel 39. The pulley 177 is interconnected with the pulley 96a on the main shaft 88 by means of a belt 178. It is thus seen that whenever the motor operates to drive the main shaft 88, the take-up reel 39 will be rotatably operated in synchronism with the driving mechanism.

On the shaft 37 carrying the reel 38, there is also provided a pulley 179 which is in substantial alignment with the pulley 96 on the main shaft 88 and which is so designed that the film may be rewound after it has been projected. The rewinding may be effected directly from the reel 39 to the reel 38 by removing one end of the belt 178 from the pulley 177 and attaching it in reversed position to the pulley 179, as clearly shown in dotted lines in Fig. 3 of the drawings.

In connection with our improved motion picture projector construction, we have also provided novel means for removably mounting the reels 38 and 39 on the shafts 36 and 37, respectively. As clearly shown in Figs. 19 to 22, the reels 38 and 39 are of usual construction being provided with a centrally disposed aperture 180 designed to be freely slidably received on the shafts 36 and 37. The aperture 180 is provided with a notch 181 extending outwardly from the aperture 180. The said notch 181 is designed to receive therein a portion of the resilient wire members 182 fixed to the shafts 36 and 37.

Each of the wire members 182 is so constructed and arranged that a portion 182a thereof is fixedly held in a slot 183, in the plug member 184, said plug member 184 being fixed to the slotted end 37a of one of the shafts, such as for example, shaft 37. The shaft 37 is provided with an opening 185 communicating with slot 37a and, through which the wire member 182 is adapted to project. The free end 182a of the member 182 is freely housed within a slotted opening 186 in a disk member 187, which is fixed to the shaft 37 for rotation therewith. In mounting the reel 38 on the shaft 37, the notch 181 is placed in alignment with the member 182 and the reel 38 then slidably moved on the shaft 37 until the said reel abuts the disk member 187. It is noted that the member 182 is provided with an inclined portion terminating in a rounded bulging portion 182c which serves to press the portion 182a downwardly until the inner wall of the reel has passed the portion 182c, at which time the portion 182a snaps upwardly in place to hold the reel fixed to the shaft 37 for rotation therewith. If desired, an additional notch 181a may be provided to facilitate the location of the reel 38 on the shaft 37.

The driving belts 97 and 178 may be made of different tension and in order to distinguish between the same when assembling, said belts may be constructed of materials of different color so that they may be easily recognized.

Figure 23:
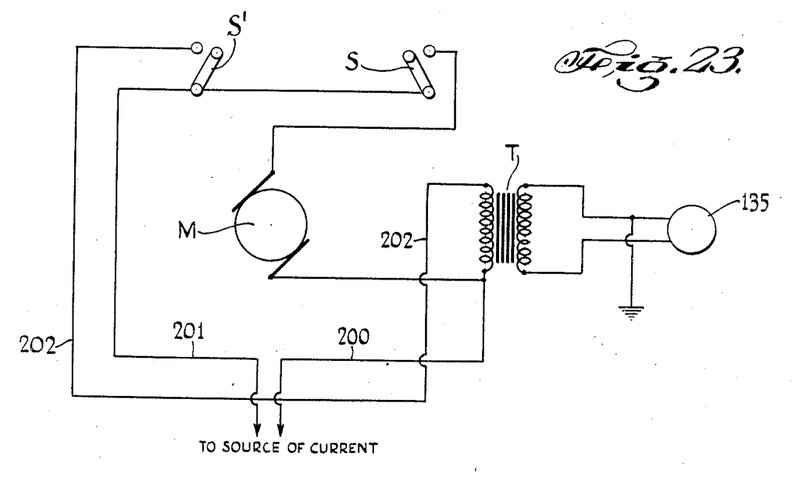
Figs. 23 and 24 are wiring diagrams illustrating the method of independently operating the motor and lamp.

By our invention we have provided means whereby the projector may be adapted for use to project motion pictures, or if desired, it may be used for showing still pictures. In Fig. 23 of the drawings, there is shown a wiring diagram illustrating the means for independently operating the light source 135 and the motor M for use with an alternating current source. In this form the motor M is connected to a source of current by the lead lines 200 and 201 and is controlled by the switch S. The lamp 135 is connected to the same source of current supply by the lead wire 200, through the transformer T, the lead wire 202 and the wire 201. It is thus seen that either the motor M alone or the lamp 135 alone may be energized or they may both be energized at the same time by closing both switches S and S'.

Figure 24:
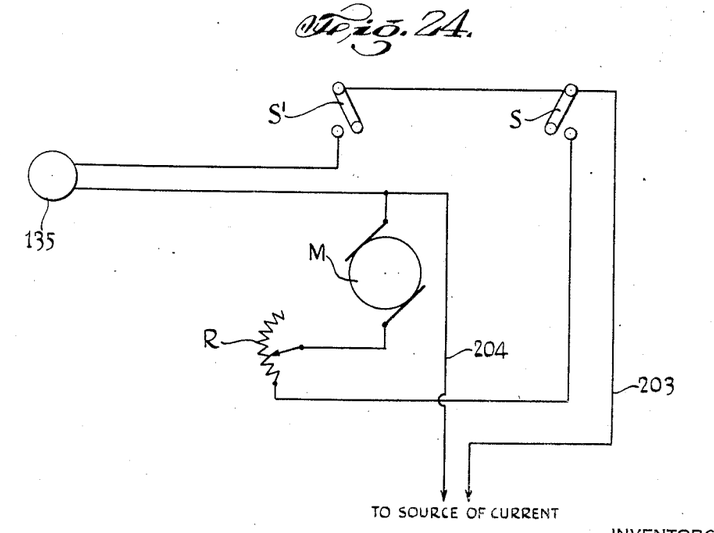

In Fig. 24 there is shown a wiring diagram similar to the wiring diagram shown in Fig. 23 but adapted for use with both A. C. and D. C. supply. In this form there is employed a rheostat R in place of the transformer T, and the motor M is connected to the source of supply by the lead 203 through the switch S and rheostat R to the motor M, and the lead line 204. The lamp 135 is connected to the source of supply through the leads 203 and 204 and through the switch S'.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall interconnecting said vertical walls, said horizontal wall overlying said motor housing top wall, means for attaching said support to said compartment, projector mechanism mounted on said main wall and reel shafts journaled in said flanges.

2. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall interconnecting said vertical walls, said horizontal wall overlying said motor housing top wall, means for attaching said support to said compartment, projector mechanism mounted on said main wall, said projector mechanism comprising a main driving shaft journaled in said main wall and having portions projecting on opposite sides of said wall, a cam fixed to said shaft, and a reciprocating shuttle directly actuated by said cam.

3. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall interconnecting said vertical walls, said horizontal wall overlying said motor housing top wall, means for attaching said support to said compartment, projector mechanism mounted on said main wall, said projector mechanism comprising a main driving shaft journaled in said main wall and having portions projecting on opposite sides of said wall, a cam fixed to said shaft, a reciprocating shuttle directly actuated by said cam, a pinion fixed to said main shaft for rotation therewith, and a chain of gearing supported by said main wall and adapted to be actuated by said main shaft pinion.

4. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall interconnecting said vertical walls, said horizontal wall overlying said motor housing top wall, means for attaching said support to said compartment, projector mechanism mounted on said main wall, said projector mechanism comprising a main driving shaft journaled in said main wall and having portions projecting on opposite sides of said wall, a cam fixed to said shaft, a reciprocating shuttle directly actuated by said cam, a pinion fixed to said main shaft for rotation therewith, and a chain of gearing supported by said main wall and adapted to be actuated by said main shaft pinion, said pinion and said gearing chain being disposed on one side of said main wall, and said cam and shuttle being disposed on the opposite side of said wall.

5. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall interconnecting said vertical walls, said horizontal wall overlying said motor housing top wall, means for attaching said support to said compartment, projector mechanism mounted on said main wall, said projector mechanism comprising a main driving shaft journaled in said main wall and having portions projecting on opposite sides of said wall, a cam fixed to said shaft, a reciprocating shuttle directly actuated by said cam, a pinion fixed to said main shaft for rotation therewith, and a chain of gearing supported by said main wall and adapted to be actuated by said main shaft pinion, said pinion and said gearing chain being disposed on one side of said main wall, and said cam and shuttle being disposed on the opposite side of said wall, said gearing chain being surrounded by an upstanding wall at right angles to said main wall to form an open box-like casing.

6. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall interconnecting said vertical walls, said horizontal wall overlying said motor housing top wall, means for attaching said support to said motor housing, projector mechanism mounted on said main wall, said projector mechanism comprising a main driving shaft journaled in said main wall and having portions projecting on opposite sides of said wall, a cam fixed to said shaft, a reciprocating shuttle directly actuated by said cam, a pinion fixed to said main shaft for rotation therewith, and a chain of gearing supported by said main wall and adapted to be actuated by said main shaft pinion, said pinion and said gearing chain being disposed on one side of said main wall, and said cam and shuttle being disposed on the opposite side of said wall, said gearing chain being surrounded by an upstanding wall at right angles to said main wall to form an open box-like casing, and a removable cover for said open part of said casing to protectively enclose said gearing.

7. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall overlying said motor housing top wall, means for attaching said support to said motor housing, projector mechanism mounted on said main wall, said projector mechanism comprising a main driving shaft journaled in said main wall and having portions projecting on opposite sides of said wall, a cam fixed to said shaft, a reciprocating shuttle directly actuated by said cam, a pinion fixed to said main shaft for rotation therewith, and a chain of gearing supported by said main wall and adapted to be actuated by said main shaft pinion, said pinion and said gearing chain being disposed on one side of said main wall, and said cam and shuttle being disposed on the opposite side of said wall, said gearing chain being surrounded by an upstanding wall at right angles to said main wall to form an open box-like casing, a removable cover for said open part of said casing to protectively enclose said gearing, a portion of said main driving shaft projecting through said cover, and a pulley fixed to said main shaft projecting portion adapted to be driven from said motor.

8. In a motion picture projector, in combination, a motor housing having a top wall, a one-piece rigid support comprising a vertical main wall having flanges projecting in a plane substantially parallel to the plane of said main wall, a vertical auxiliary wall at right angles to said main wall, and a horizontal wall interconnecting said vertical walls, said horizontal wall overlying said motor housing top wall, means for attaching said support to said motor housing, projector mechanism mounted on said main wall, said projector mechanism comprising a main driving shaft journaled in said main wall and having portions projecting on opposite sides of said wall, a cam fixed to said shaft, a reciprocating shuttle directly actuated by said cam, a pinion fixed to said main shaft for rotation therewith, and a chain of gearing supported by said main wall and adapted to be actuated by said main shaft pinion, said pinion and said gearing chain being disposed on one side of said main wall, and said cam and shuttle being disposed on the opposite side of said wall, said gearing chain being surrounded by an upstanding wall at right angles to said main wall to form an open box-like casing, and a portion of said auxiliary wall being utilized as a part of said surrounding wall.

9. In a motion picture projector, in combination, a motor housing having a top wall, an opening in said top wall, a one-piece rigid support comprising a vertical main wall, a vertical auxiliary wall at right angles to said main wall, said vertical walls terminating at their lower edges in an interconnecting horizontal wall, said horizontal wall overlying said motor housing top wall, means for attaching said horizontal wall to said housing, a one-piece vertically disposed unit of generally U-shaped transverse cross-sectional contour, and means for attaching the free vertical edges of said unit to said vertical auxiliary wall to form a hollow rectangular casing adapted to serve as a lamp house.

10. In a motion picture projector, in combination, a motor housing having a top wall, an opening in said top wall, a one-piece rigid support comprising a vertical main wall, a vertical auxiliary wall at right angles to said main wall, said vertical walls terminating at their lower edges in an interconnecting horizontal wall, said horizontal wall overlying said motor housing top wall, means for attaching said horizontal wall to said housing, a one-piece vertically disposed unit of generally U-shaped transverse cross-sectional contour, and means for attaching the free vertical edges of said unit to said vertical auxiliary wall to form a hollow rectangular casing adapted to serve as a lamp house, the lower horizontal edges of said unit resting upon said motor housing top wall.

11. In a motion picture projector, in combination, a motor housing having a top wall, an opening in said top wall, a one-piece rigid support comprising a vertical main wall, a vertical auxiliary wall at right angles to said main wall, said vertical walls terminating at their lower edges in an interconnecting horizontal wall, said horizontal wall overlying said motor housing top wall, means for attaching said horizontal wall to said housing, a one-piece vertically disposed unit of generally U-shaped transverse cross-sectional contour, and means for attaching the free vertical edges of said unit to said vertical auxiliary wall to form a hollow rectangular casing adapted to serve as a lamp house, the lower horizontal edges of said unit resting upon said motor housing top wall and surrounding the said opening therein to form a continuous passageway from said motor housing through said lamp house.

12. In a motion picture projector, in combination, a motor housing having a top wall, an opening in said top wall, a one-piece rigid support comprising a vertical main wall, a vertical auxiliary wall at right angles to said main wall, said vertical walls terminating at their lower edges in an interconnecting horizontal wall, said horizontal wall overlying said motor housing top wall, means for attaching said horizontal wall to said housing, a one-piece vertically disposed unit of generally U-shaped transverse cross-sectional contour, means for attaching the free vertical edges of said unit to said vertical auxiliary wall to form a hollow rectangular casing adapted to serve as a lamp house, the lower horizontal edges of said unit resting upon said motor housing top wall and surrounding the said opening therein to form a continuous passageway from said motor housing through said lamp house, and a removable top cover for said lamp house.

13. In a motion picture projector, in combination, a motor housing having a top wall, an opening in said top wall, a one-piece rigid support comprising a vertical main wall, a vertical auxiliary wall at right angles to said main wall, said vertical walls terminating at their lower edges in an interconnecting horizontal wall, said horizontal wall overlying said motor housing top wall, means for attaching said horizontal wall to said housing, a one-piece vertically disposed unit of generally U-shaped transverse cross-sectional contour, means for attaching the free vertical edges of said unit to said vertical auxiliary wall to form a hollow rectangular casing adapted to serve as a lamp house, a light aperture in said auxiliary wall, a projecting lens mounted on said main wall so as to be in optical alignment with said light aperture.

14. In a motion picture projector, in combination, a motor housing having a top wall, an opening in said top wall, a one-piece rigid support comprising a vertical main wall, a vertical auxiliary wall at right angles to said main wall, said vertical walls terminating at their lower edges in an interconnecting horizontal wall, said horizontal wall overlying said motor housing top wall, means for attaching said horizontal wall to said housing, a one-piece vertically disposed unit of generally U-shaped transverse cross-sectional contour, means for attaching the free vertical edges of said unit to said vertical auxiliary wall to form a hollow rectangular casing adapted to serve as a lamp house, a light aperture in said auxiliary wall, a projecting lens mounted on said main wall so as to be in optical alignment with said light aperture, and a shutter rotatably mounted on said auxiliary wall for cooperative action with said light aperture.

OTTO W. GITHENS.
GEORGE KENDE.
EVERETT MELBOURN PORTER.